US012278905B2

(12) United States Patent
Gaál et al.

(10) Patent No.: US 12,278,905 B2
(45) Date of Patent: Apr. 15, 2025

(54) AUTOMATIC DISTRIBUTION OF DYNAMIC HOST CONFIGURATION PROTOCOL (DHCP) KEYS VIA LINK LAYER DISCOVERY PROTOCOL (LLDP)

(71) Applicant: Telefonaktiebolaget LM Ericsson (PUBL), Stockholm (SE)

(72) Inventors: Géza Gaál, Budapest (HU); Balázs Varga, Budapest (HU); János Szabó, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 366 days.

(21) Appl. No.: 17/434,069

(22) PCT Filed: Feb. 28, 2019

(86) PCT No.: PCT/SE2019/050174
§ 371 (c)(1),
(2) Date: Aug. 26, 2021

(87) PCT Pub. No.: WO2020/176021
PCT Pub. Date: Sep. 3, 2020

(65) Prior Publication Data
US 2022/0141027 A1   May 5, 2022

(51) Int. Cl.
*H04L 29/06* (2006.01)
*H04L 9/08* (2006.01)
(Continued)

(52) U.S. Cl.
CPC .......... *H04L 9/3242* (2013.01); *H04L 9/0825* (2013.01); *H04L 9/3247* (2013.01); *H04L 61/5014* (2022.05)

(58) Field of Classification Search
CPC ................. H04L 9/3242; H04L 9/0825; H04L 9/3247; H04L 61/5014
See application file for complete search history.

(56) References Cited

U.S. PATENT DOCUMENTS 11,768,930 B2 *  9/2023  Cheng ................... H04L 63/083
                                                             726/19
2007/0081494 A1 *  4/2007  Petrescu ........... H04W 36/0016
                                                             370/331
(Continued)

FOREIGN PATENT DOCUMENTS

IN    1506DE2013      4/2016
WO    2019125238 A1   6/2019
WO    2019125239 A1   6/2019

OTHER PUBLICATIONS

Authentication for DHCP Messages by R. Droms, et al.; Networking Working Group; Request for Comments: 3118; Category: Standards Track—Jun. 2001.
(Continued)

*Primary Examiner* — Evans Desrosiers
(74) *Attorney, Agent, or Firm* — Baker Botts L.L.P.

(57) ABSTRACT

A method for obtaining information from a server. The method includes a client device receiving a link layer message transmitted by a network node, the link layer message comprising authentication information; and the client device using the authentication information to obtain information from the server.

14 Claims, 6 Drawing Sheets

(51) Int. Cl.
*H04L 9/32* (2006.01)
*H04L 61/5014* (2022.01)

(56) References Cited

U.S. PATENT DOCUMENTS

| | | | | |
|---|---|---|---|---|
| 2007/0271606 | A1* | 11/2007 | Amann | H04W 12/02 726/15 |
| 2008/0282325 | A1 | 11/2008 | Oyama et al. | |
| 2010/0040078 | A1* | 2/2010 | Newpol | H04L 69/40 370/419 |
| 2015/0237003 | A1* | 8/2015 | Ghai | H04L 61/503 709/220 |
| 2020/0220873 | A1* | 7/2020 | Adiga | H04L 63/10 |
| 2021/0329059 | A1* | 10/2021 | Hong | H04L 67/06 |

OTHER PUBLICATIONS

PCT International Search Report issued for International application No. PCT/SE2019/050174—Oct. 31, 2019.
IEEE Standard for Local and Metropolitan Area Networks—Station and Media Access Control Connectivity Discovery; IEEE Computer Society; IEEE Std 802.1AB [due to size, this reference has been split into three parts]—2016.
Technical Report; DSL Form, TR-101, Migration to Ethernet-Based DSL Aggregation; Produced by: Architecture and Transport Working Group—Apr. 2006.
PCT Written Opinion of the International Searching Authority issued for International application No. PCT/SE2019/050174—Oct. 31, 2019.

* cited by examiner

AUTOMATIC DISTRIBUTION OF DYNAMIC HOST CONFIGURATION PROTOCOL (DHCP) KEYS VIA LINK LAYER DISCOVERY PROTOCOL (LLDP)

PRIORITY

This nonprovisional application is a U.S. National Stage Filing under 35 U.S.C. § 371 of International Patent Application Serial No. PCT/SE2019/050174 filed Feb. 28, 2019 and entitled "AUTOMATIC DISTRIBUTION OF DYNAMIC HOST CONFIGURATION PROTOCOL (DHCP) KEYS VIA LINK LAYER DISCOVERY PROTOCOL (LLDP)" which is hereby incorporated by reference in its entirety.

TECHNICAL FIELD

This disclosure relates to the dynamic host configuration protocol (DHCP) and the link layer discovery protocol (LLDP).

BACKGROUND

Many organizations implement a comprehensive security policy encompassing almost all OSI layers, but one area that is often left untouched is DHCP. If the Data Link Layer and DHCP are not properly secured, the network may be exposed to a variety of attacks and compromises. In some instances, administrators may mitigate security threats by restricting network access to registered subscribers and authorized devices.

DHCP Authentication, as explained in Request for Comment (RFC) 3118, describes an enhancement that replaces normal DHCP messages with authenticated DHCP messages. Clients and servers check authentication information and reject DHCP messages that come from invalid sources. The technology involves the use of a new DHCP option type, the Authentication option.

The protocol extension, as explained in RFC 3118, introduces a shared secret key for authentication, but secret key management has not been solved in the current standard, it is expected to happen 'out-of-band'. For example, a network management system (NMS) may preconfigure clients and servers via command line interface (CLI)-Secure Shell (SSH)/Simple Network Management Protocol (SNMP) with secret keys before DHCP communication.

Figure 1:
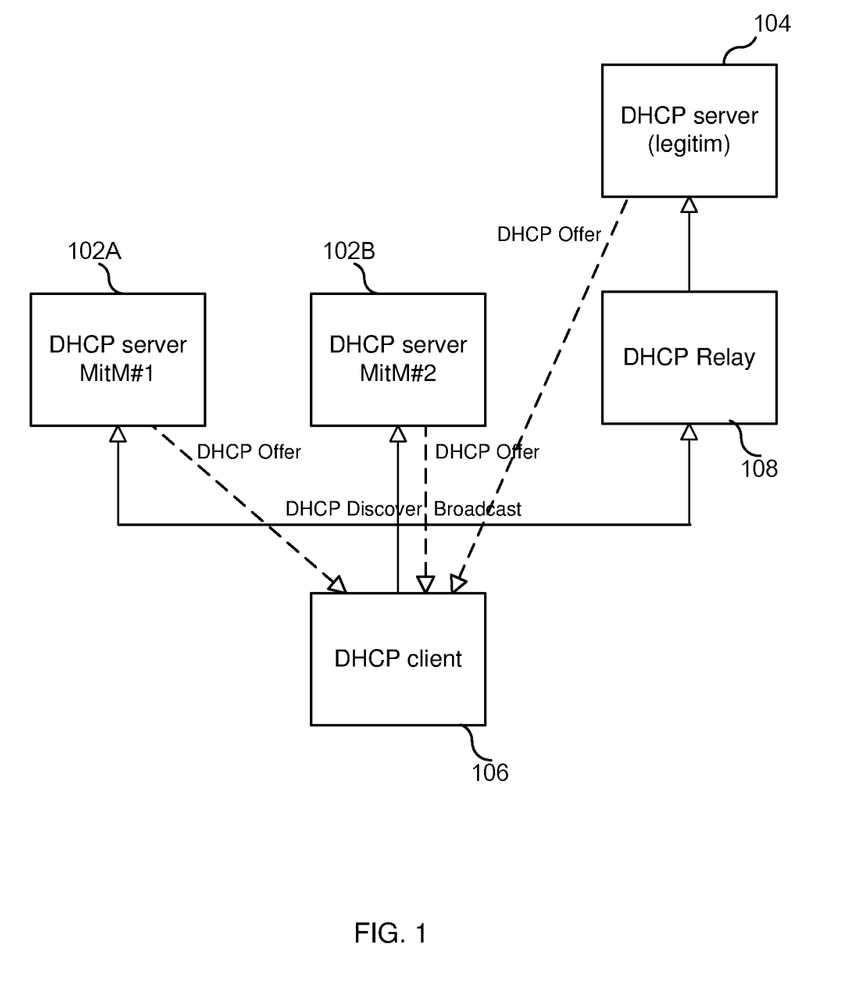
FIG. 1 shows a process flow according to one embodiment.

The security threats that a network may be exposed to due to a lack of secret key management is described in the current standard. Specifically, the current standard explains that if a MitM (Man-in-the-Middle) attacker 102A, 102B answers, e.g., with a DHCP-Offer, quicker than a legitimate DHCP server 104, then control of a DHCP client 106 can be overtaken by the MitM attacker 102A, 102B, as shown in FIG. 1.

The biggest challenge of implementation in real network scenarios is the secure key exchange process (e.g., secret key management), and an automatic solution for the exchange process has not yet been solved. Accordingly, secure key exchange is the biggest impediment of spreading protocol extension. IP connectivity is ensured only after successful DHCP communication, and secure key exchange should happen prior to the establishment of any IP connectivity.

SUMMARY

One embodiment is directed to key exchange for a DHCP client using LLDP messages. The proposed solution may be used universally in different network scenarios in alternative embodiments.

In some embodiments, some prerequisites for the disclosed automatic key exchange are provided as follows:

An upstream neighbor node of a new DHCP client is an already trusted (i.e., authorized for sending keys) node.

LLDP security extensions are implemented on the DHCP client and the upstream neighbor node.

The upstream neighbor node is management controlled, and a DHCP key for the new DHCP-client may be securely provided to the upstream neighbor node.

When the prerequisites provided above are met, the upstream neighbor node can provide the DHCP key via LLDP extensions to the DHCP client before the DHCP client transmits or receives any DHCP messages. The DHCP client uses the DHCP key and associated credentials in order to perform authenticated DHCP. Accordingly, the proposed solution disclosed herein solves the following security challenge of LLDP based secure key exchange for using authenticated DHCP.

An advantage provided by the embodiments disclosed herein is that there is no need for manual processes to exchange DHCP related keys in advance. A DHCP server may allocate addresses from its address pools comprising a range/group of IP addresses only to "trusted/legitimate" DHCP clients. Furthermore, DHCP clients may only accept offers from legitimate DHCP servers.

Many network deployments apply DHCP-based network configuration in order to reduce manual configuration. DHCP messages usually include client configuration information. While DHCP provides flexible network setup and configuration, DHCP based networks may be susceptible to various kinds of attacks.

Several networking technologies have been developed around DHCP in order to mitigate such attacks (e.g., DHCP spoofing, ARP spoofing, etc.). However, such networking technologies are based on the assumption of a trusted DHCP information exchange.

In order to increase security of the DHCP protocol itself, DHCP Message authentication was standardized and a special DHCP option (hereinafter referred to as "DHCP option 90") was introduced in RFC 3118. Again, however, the authentication related key management is not solved in the current standard, and constraints of the usage of DHCP authentication in real network scenarios are yet to be determined.

The wide implementation of DHCP message authentication has been restrained by the lack of automatic key distribution. More specifically, manually providing unique keys for each DHCP client would negate the major advantage of DHCP—the offering of fully automatic network configuration.

The increasing number of network devices (e.g., massive increase IoT devices in 5G networks, etc.) requires more network connections and nodes, and therefore network automation is essential for future networks. In accordance, security must be a built-in function in future networks. In order to simplify and speed up future deployments, network devices should be configured securely and fully automatically.

DHCP plays a very important role in future network automatization and securing DHCP is mandatory. As noted above, manual key management for DHCP is not acceptable for future networks.

DHCP is a prerequisite to establish automatic IP connectivity for a device in a network. At the beginning of the DHCP process, a device has no IP connectivity. Consequently, any security attributes (i.e., keys) required during DHCP communication should be present and key exchange should not rely on IP connectivity.

Additionally, many modern network automatization techniques rely heavily on the LLDP protocol. LLDP communication may precede any other protocol communication between neighboring nodes. In some embodiments, secure communication via LLDP may be used to exchange attributes used during communication of other protocols, such as for example, DHCP.

In one embodiment, security extensions of the LLPD, which is a Layer 2 (i.e., Data Link Layer) protocol, are utilized for the secure communication of the keys and attributes used for DHCP. In some embodiments, LLDP neighbor nodes (also referred to as "LLDP peers") are authenticated by asymmetric keys (i.e., LLDP keys). In some embodiments, the LLDP keys and the DHCP keys may differ.

In some embodiments, a LLDP-based communication channel, i.e., a communication between LLDP peers secured with asymmetric keys, may be used to send any kind of encrypted information between the LLDP peers. For example, symmetric keys for DHCP and DHCP attributes, among others, may be transmitted via the LLDP-based communication channel. In some embodiments, organizationally specific type-length-value (TLV) components are used to send the encrypted information.

The encrypted information (e.g., DHCP symmetric keys and DHCP attributes) transmitted via the LLDP-based communication channel may be used during the DHCP process to authenticate DHCP messages.

In an aspect, there is provided a method for obtaining information from a server, the method comprising: a client device receiving a link layer message transmitted by a network node, the link layer message comprising authentication information; and the client device using the authentication information to obtain information from the server.

In some embodiments, the client device using the authentication information to obtain information from the server.

In some embodiments, the client device is a DHCP client device and the server is a DHCP server.

In some embodiments, the link layer message is a Link Layer Discovery Protocol (LLDP) message comprising a plurality of type-length-value (TLV) components. In some embodiments, the authentication information is included in at least one or more TLV components.

In some embodiments, using the authentication information to obtain information from the server comprises: the client device transmitting a discover message (e.g., DHCP discover) including the client identifier; the client device receiving an offer message (e.g., DHCP offer) transmitted by the server, wherein the second DHCP message includes the unique identifier and a signature, and wherein the signature is based on a Hash-based Message Authentication Code (HMAC) calculated using at least the key; the client device transmitting a request message (e.g., DHCP request) including the unique identifier and the signature; and the client device receiving an acknowledge message (e.g., DHCP acknowledge) including the unique identifier and the signature.

In another aspect there is provided a computer program comprising instructions for adapting a client device to perform any of the methods described above.

In another aspect there is provided a client device adapted to perform any of the method described above.

The proposed solution solves the challenges of DHCP key management. In some embodiments, LLDP and security extensions provided by the LLDP may be used to enable DHCP key exchange. Trusted network nodes may be automatically configured with keys (e.g., DHCP symmetric keys) and related attributes (e.g., DHCP attributes) for authenticated DHCP.

In some embodiments, the proposed solution may be applied in 5G deployments in order to securely cope with the increased amount of node installations.

BRIEF DESCRIPTION OF THE DRAWINGS

The accompanying drawings, which are incorporated herein and form part of the specification, illustrate various embodiments.

DETAILED DESCRIPTION

LLDP security extensions realize asymmetric key based security between LLDP peers. The LLDP peers use each other's public key for authentication. In some embodiments, each public key is signed by a trusted third party. After successful authentication, LLDP encryption supports asymmetric encryption with a LLDP peer's public key to allow secure information sharing.

In some embodiments, the proposed solution utilizes an encrypted LLDP container to forward secret information between the neighbor nodes (the LLDP peers). In some embodiments, the secret information comprises keys and attributes used for DHCP authentication. In some embodiments, the encrypted LLDP container is defined by organizationally specific TLVs.

Successful LLDP authentication between the LLDP peers is a prerequisite for LLDP encryption and DHCP key and DHCP attribute exchange via one or more encrypted LLDP container.

Figure 2A:
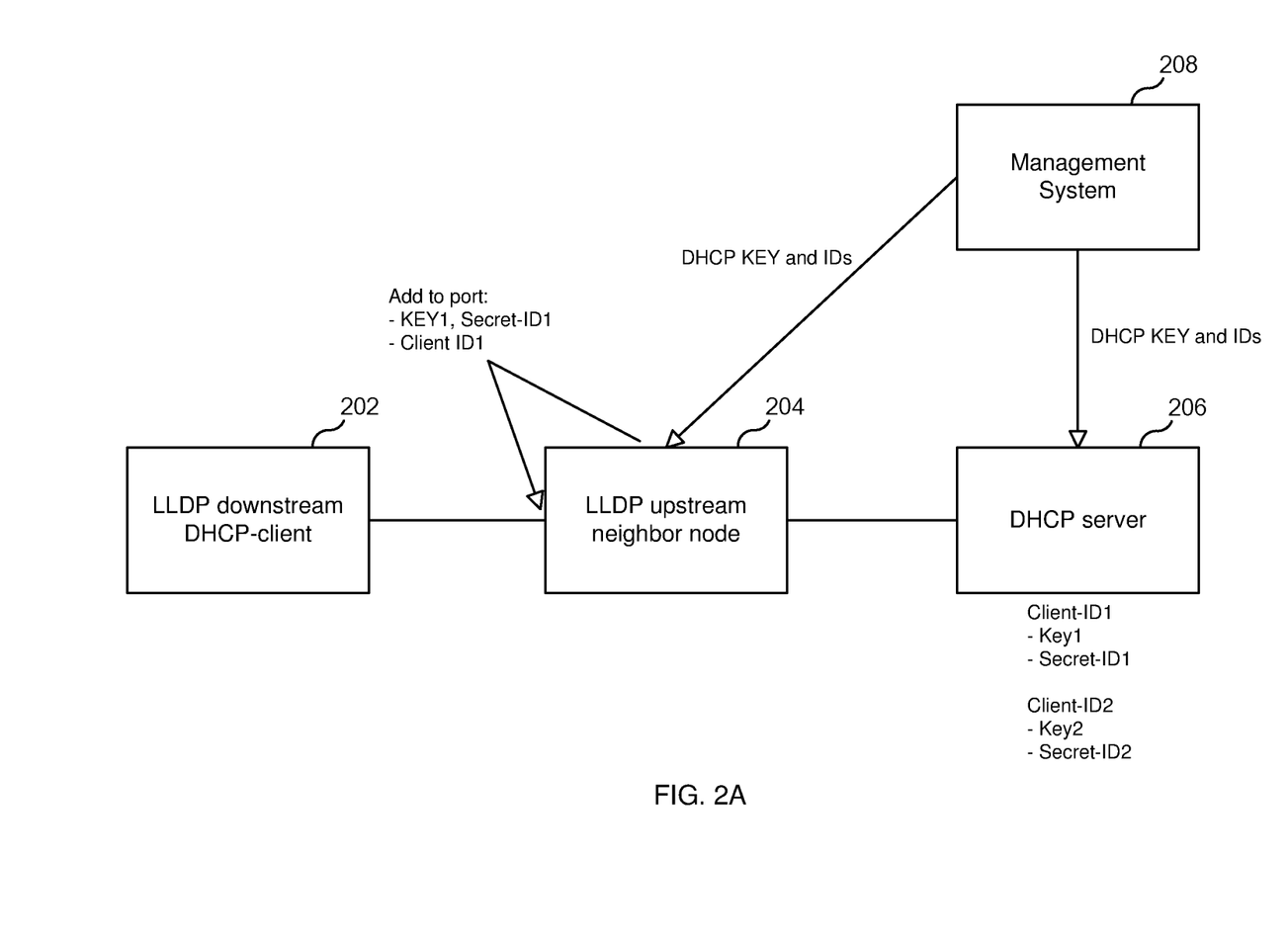
FIGS. 2A-2B show process flows according to some embodiments.

In some embodiments, three network elements may participate in the automatic key exchange disclosed herein and resulting DHCP communication. As shown in FIG. 2A, the three network elements may be provided as follows: (1) a DHCP client 202 (also referred to as the LLDP downstream DHCP client) which intends to request an IP address (and network configuration) via DHCP and is the LLDP downstream neighbor of a trusted node (i.e., a LLDP upstream neighbor node); (2) a LLDP upstream neighbor node 204 which is the trusted node that sends secret information (e.g., DHCP key and DHCP attributes for DHCP authentication) to the DHCP client 202 via LLDP; and (3) a DHCP server 206 which is responsible for secure IP address allocation.

In some embodiments, the DHCP server and the DHCP client are not directly connected, and one or more DHCP relay agents are used to forward a request from the DHCP client to the DHCP server. DHCP authentication requires a DHCP key for each DHCP client and DHCP server communication. In some embodiments, the DHCP key is unique. In some embodiments, the DHCP key is provided by the LLDP upstream neighbor node 204 to the DHCP client 202, as will be described in further detail below with reference to FIG. 2B.

Referring back to FIG. 2A, the DHCP key may be preconfigured by a management system 208. In some embodiments, the DHCP key may be preconfigured by a software defined network (SDN) controller. As shown in FIG. 2A, the DHCP-server 206 and the LLDP upstream neighbor node 204 may be preconfigured with the DHCP key and related IDs by management 208. In some embodiments, the related IDs comprise a Secret ID and a Client ID, as will be described in further detail below with reference to FIG. 2B. For example, the related IDs may include a first client ID (e.g., Client-ID1) and associated Secret ID (e.g., Secret-ID1). In some embodiments, the DHCP key and related IDs may be associated to an interface of the trusted LLDP upstream neighbor for an expected new DHCP client 202. For example, the DHCP key and related IDs may be added to a port of the LLDP upstream neighbor node 204. In some embodiments, the preconfigured DHCP server 206 has stored client information (e.g., Client ID) with associated DHCP information (e.g., DHCP key and DHCP attribute). In some embodiments, DHCP attributes include secret IDs. For example, the DHCP-server 206 stores a first client ID (e.g., Client-ID1) and associated DHCP information (e.g., Key 1 and Secret-ID1) for a potential first DHCP client and a second client ID and associated DHCP information for a potential second DHCP client.

Figure 2B:
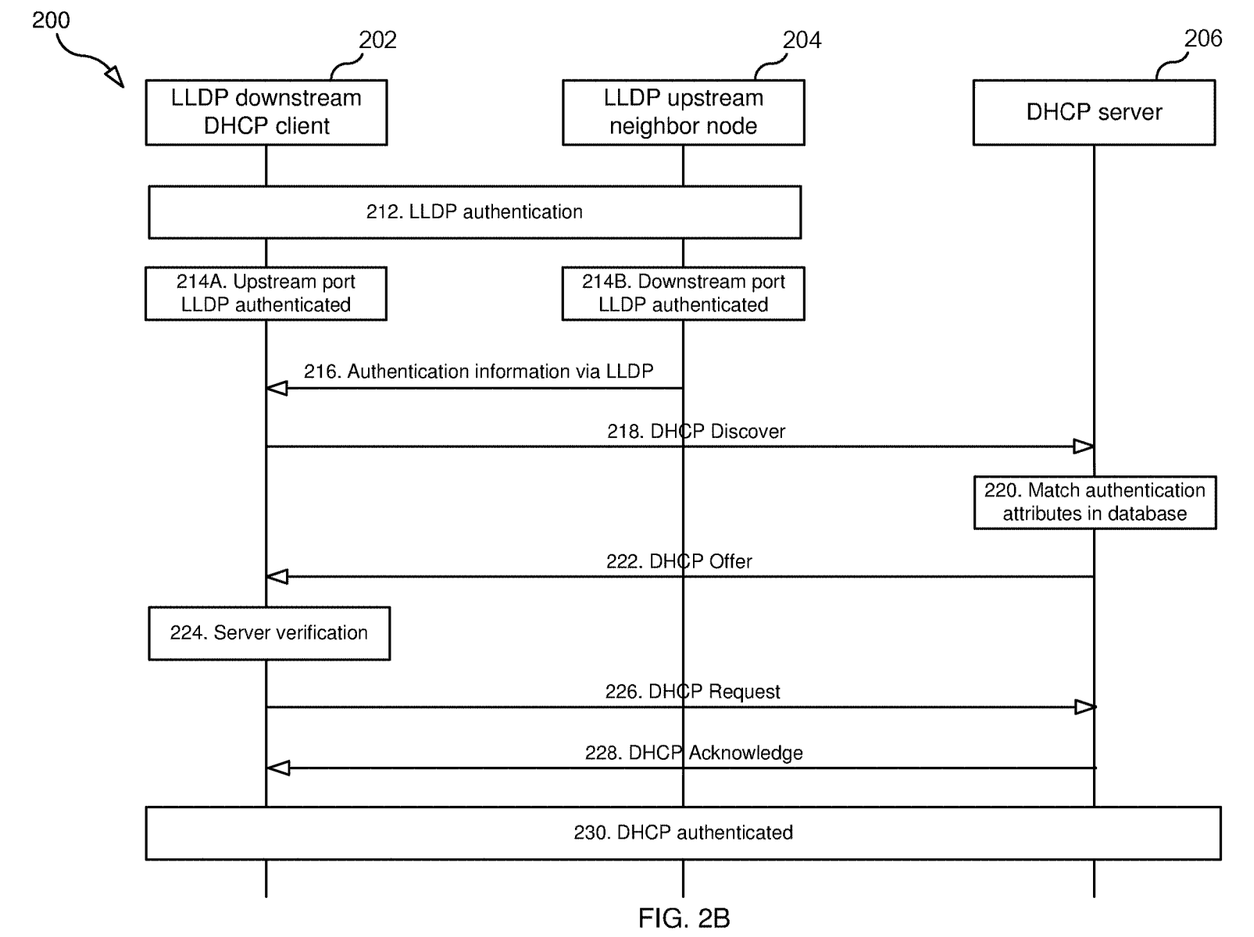

FIG. 2B illustrates a process 200 when a new DHCP client 202 connects to a DHCP server 206 according to some embodiments. As shown in FIG. 2B, a secure LLDP connection is established between the DHCP client 202 and the LLDP upstream neighbor node 204 (212). Accordingly, an upstream port for the DHCP client 202 is LLDP authenticated (214A) and a downstream port for the LLDP upstream neighbor node 204 is LLDP authenticated (214B).

Once the secure LLDP connection between the DHCP client 202 and the LLDP upstream neighbor node 204 is established, the LLDP upstream neighbor node 204 provides DHCP authentication information to the DHCP client 202 via LLDP (216). Three parameters are needed by the DHCP client 202 to allow authenticated DHCP with the DHCP server 206: (1) a Key used for encryption (e.g., used by HMAC calculation); a Secret ID (as described in DHCP option 90) which is a unique identifier for a secret value (i.e., the Key used for encryption) used to generate a message authentication code for a DHCP message; and a Client-ID (as described in DHCP option 61) to identify a client and the associated Key on the DHCP server 206. In some embodiments, the DHCP authentication information comprises a unique DHCP key and related DHCP attributes for the DHCP client 202. For example, the DHCP authentication information may include {"KEY1, Secret-ID1" and "Client-ID1"} where Client-ID1 is the Client ID for DHCP client 202, KEY1 is the key to be used for encryption, and Secret-ID1 is a unique identifier (e.g., a pointer) indicating the KEY1. In some embodiments, the DHCP authentication information is transmitted to the DHCP client 202 via LLDP in an encrypted container. In some embodiments, the encrypted LLDP container is defined by organizationally specific TLVs.

The DHCP client 202 then uses the received DHCP authentication information to perform authenticated DHCP communication with the DHCP-server 206. For example, the DHCP client 202 may start a secure DHCP process with DHCP authentication as described in RFC3118 after the DHCP client 202 has received the three DHCP attributes (i.e., Key, Secret-ID, and Client-ID) as described in further detail below with reference to steps 218-230 of FIG. 2B.

In some embodiments, after receiving the DHCP authentication information from the LLDP upstream neighbor node 204, the DHCP client 202 transmits a DHCP discover message to the DHCP server 206 (218). In some embodiments, the DHCP discover message includes the Client ID associated with the DHCP client 202. For example, the DHCP discover message may include Client-ID1.

As a result of receiving the DHCP discover message, the DHCP server 206 matches authentication attributes associated with the DHCP client 202 in a database (220). Accordingly, the DHCP server 206 obtains the DHCP attributes associated with the Client ID included in the DHCP discover message.

Then, the DHCP server 206 transmits a DHCP offer message to the DHCP client 202 (222). In some embodiments, the DHCP offer message includes: (1) a Secret-ID associated with the received Client ID; and (2) a hash-based message authentication code (HMAC) generated based on the Key associated with the received Client ID. For example, the DHCP offer message may include Secret-ID1 and the HMAC.

As a result of receiving the DHCP offer message, the DHCP client 202 verifies the DHCP server (224). Once verified, the HDCP client 202 transmits a DHCP request message to the DHCP server 206 (226). In some embodiments, the DHCP request message includes the Secret-ID and the HMAC.

In response, the DHCP server 206 transmits a DHCP acknowledge message (228) upon which DHCP is authenticated (230) for both the DHCP client 202 and the DHCP server 206. In some embodiments, the DHCP acknowledge message includes the Secret-ID and the HMAC.

In some embodiments, depending on the network scenario and key allocation method, the LLDP upstream neighbor node 204 may insert interface specific information (e.g., DHCP Option 82) in the DHCP communication, as specified in BBF-TR-101, that can be used by the DHCP server 206 to identify which key should be used to authenticate the DHCP client 202.

In some embodiments, the DHCP server 206 is aware of the attributes sent to each of the DHCP-clients and uses this information during communication with the DHCP-clients.

In some embodiments, keys can be randomly generated and then stored in the management system 208, but further security improvements may be achieved by using some algorithms to also generate individual keys.

In some embodiments, client IDs (e.g., Client-ID1 and Client-ID2) may be generated and registered by several methods (e.g., automatically by the DHCP client 202, configured by the LLDP upstream neighbor node 204, among other). The usage of such client IDs may be specific to implementation and network scenario.

Figure 3:
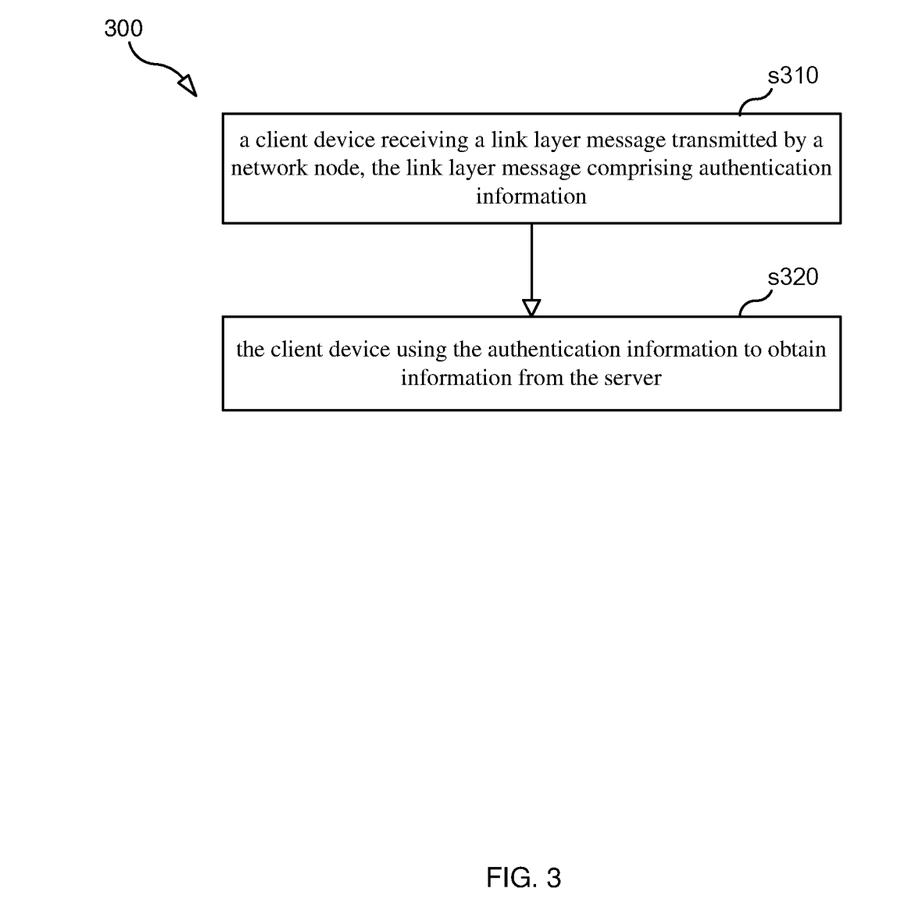
FIG. 3 is a flow chart illustrating a process according to one embodiment.

FIG. 3 is a flow chart illustrating a process 300 according to an embodiment. Process 300 is a method for obtaining information from a server (e.g., DHCP server). Process 300 may being with step s310 in which a client device (e.g., DHCP client 202) receives a link layer message (e.g., LLDP message) transmitted by a network node, the link layer message comprising authentication information (e.g., secret key). A link layer message is a data link layer protocol data unit (PDU) that does not contain any network layer PDU. For example, a link layer message does not include network routing information such as an IP address. In step s320, the client device uses the authentication information to obtain information from the server.

In some embodiments, the authentication information comprises: a key (e.g., DHCP key); a unique identifier (e.g., Secret-ID), and a client identifier (e.g., Client-ID).

In some embodiments, the client device is a DHCP client device and the server is a DHCP server.

In some embodiments, the link layer message is a Link Layer Discovery Protocol (LLDP) message comprising a plurality of type-length-value (TLV) components.

In some embodiments, the authentication information is included in at least one or more TLV components.

In some embodiments, using the authentication information to obtain information from the server comprises: the client device transmitting a discover message (e.g., DHCP discover) including the client identifier; the client device receiving an offer message (e.g., DHCP offer) transmitted by the server, wherein the second DHCP message includes the unique identifier and a signature, and wherein the signature is based on a Hash-based Message Authentication Code (HMAC) calculated using at least the key; the client device transmitting a request message (e.g., DHCP request) including the unique identifier and the signature; and the client device receiving an acknowledge message (e.g., DHCP acknowledge) including the unique identifier and the signature.

Figure 4:
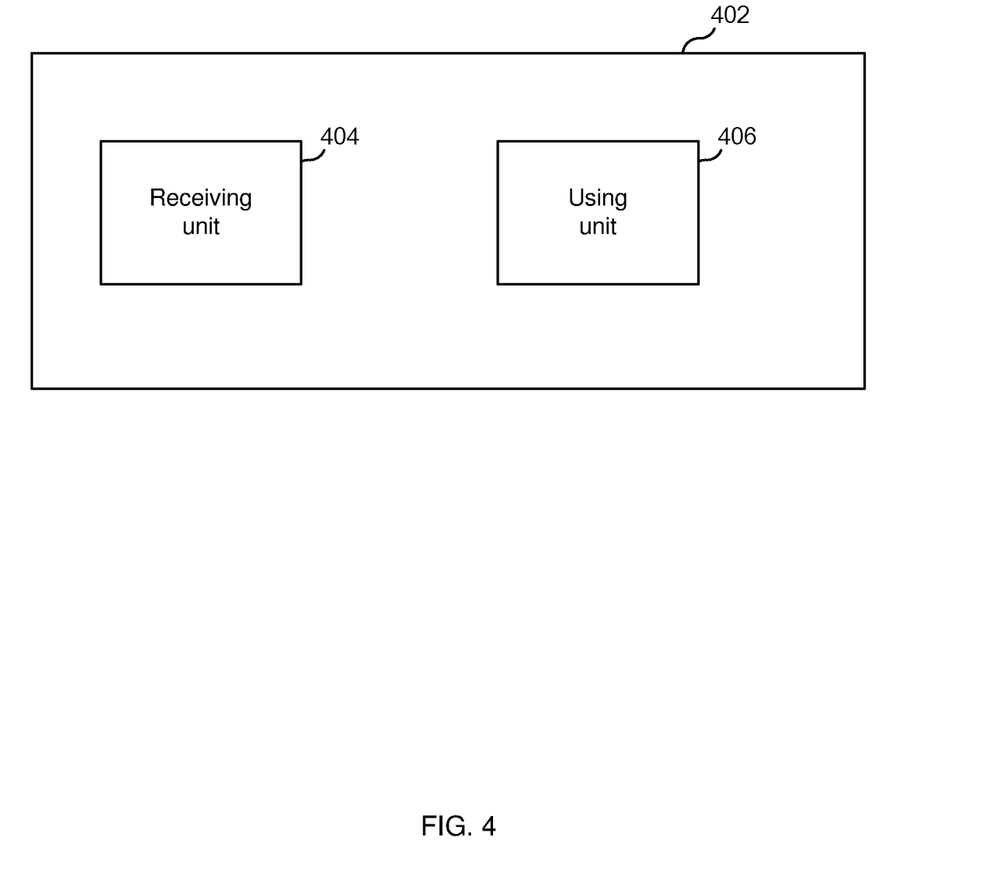
FIG. 4 is a diagram showing functional units of a client according to one embodiment.

FIG. 4 is a diagram showing functional units of a client device 402 (e.g., DHCP client 202) for obtaining information from a server (e.g., DHCP server) according to some embodiments. As shown in FIG. 4, client device 402 includes a receiving unit 404 for receiving a link layer message transmitted by a network node, the link layer message comprising authentication information; and a using unit 406 for using the authentication information to obtain information from the server.

Figure 5:
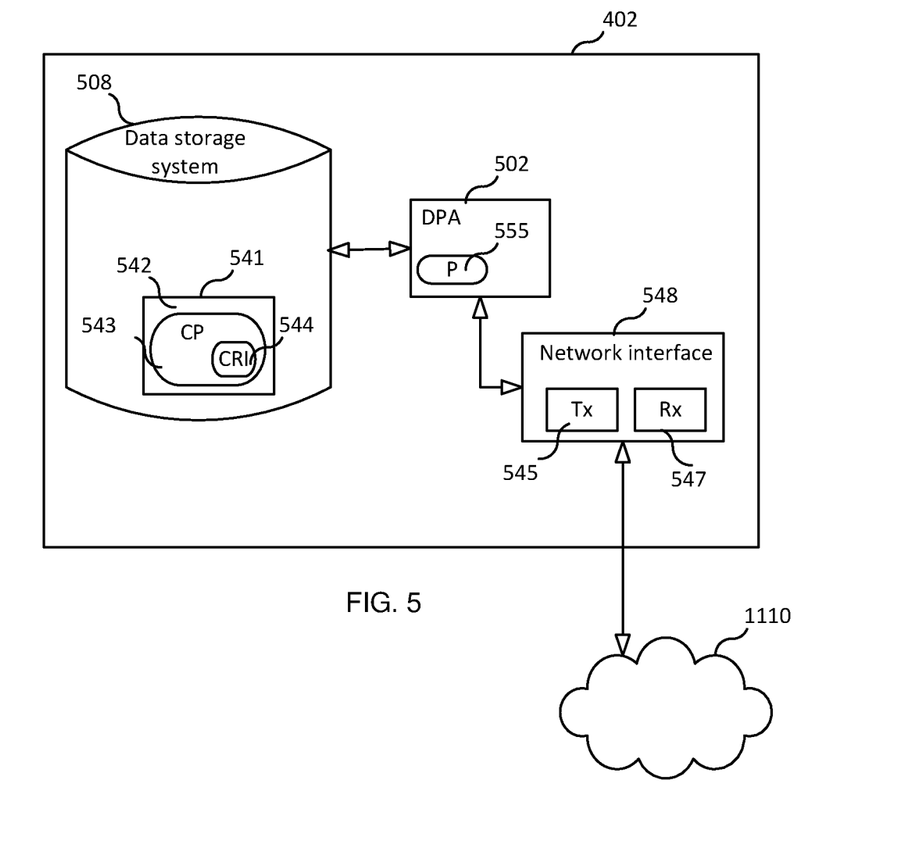
FIG. 5 is a block diagram of a node according to some embodiments.

FIG. 5 is a block diagram of a node (e.g., client device 402), according to some embodiments. As shown in FIG. 5, the node may comprise: processing circuitry (PC) 502, which may include one or more processors (P) 555 (e.g., a general purpose microprocessor and/or one or more other processors, such as an application specific integrated circuit (ASIC), field-programmable gate arrays (FPGAs), and the like); a network interface 548 comprising a transmitter (Tx) 545 and a receiver (Rx) 547 for enabling the node to transmit data to and receive data from other nodes connected to a network 1110 (e.g., an Internet Protocol (IP) network) to which network interface 548 is connected; and a local storage unit (a.k.a., "data storage system") 508, which may include one or more non-volatile storage devices and/or one or more volatile storage devices. In embodiments where PC 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, magnetic media (e.g., a hard disk), optical media, memory devices (e.g., random access memory, flash memory), and the like. In some embodiments, the CRI 544 of computer program 543 is configured such that when executed by PC 502, the CRI causes the node to perform steps described herein (e.g., steps described herein with reference to the flow charts). In other embodiments, the node may be configured to perform steps described herein without the need for code. That is, for example, PC 502 may consist merely of one or more ASICs. Hence, the features of the embodiments described herein may be implemented in hardware and/or software.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for obtaining information from a server, the method comprising:

a client device receiving a link layer message transmitted by a network node, the link layer message comprising authentication information, the link layer message excluding network routing information, the network routing information comprising an Internet protocol (IP) address, wherein the network routing information is excluded from the link layer message prior to IP connectivity for client device being established, wherein the authentication information is associated with a particular interface of the network node when the client device is identified as an expected client device; and the client device using the authentication information to obtain information from the server.

2. The method of claim 1, wherein the authentication information comprises: a key; a unique identifier, and a client identifier.

3. The method of claim 1, wherein the client device is a DHCP client device and the server is a DHCP server.

4. The method of claim 1, wherein the link layer message is a Link Layer Discovery Protocol (LLDP) message comprising a plurality of type-length-value (TLV) components.

5. The method of claim 4, wherein the authentication information is included in at least one or more TLV components.

6. The method of claim 1, wherein using the authentication information to obtain information from the server comprises:

the client device transmitting a discover message including the client identifier;

the client device receiving an offer message transmitted by the server, wherein the second DHCP message includes the unique identifier and a signature, and wherein the signature is based on a Hash-based Message Authentication Code (HMAC) calculated using at least the key;

the client device transmitting a request message including the unique identifier and the signature; and the client device receiving an acknowledge message including the unique identifier and the signature.

7. A computer program comprising instructions which, when executed by processing circuitry, causes the processing circuitry to carry out the method of claim 1.

8. A carrier containing the computer program of claim 7, wherein the carrier is one of an electronic signal, an optical signal, a radio signal, and a computer readable storage medium.

9. A client device for obtaining information from a server, the client device being adapted to:
   receive a link layer message transmitted by a network node, the link layer message comprising authentication information, the link layer message excluding network routing information, the network routing information comprising an Internet protocol (IP) address, wherein the network routing information is excluded from the link layer message prior to IP connectivity for client device being established, wherein the authentication information is associated with a particular interface of the network node when the client device is identified as an expected client device; and
   use the authentication information to obtain information from the server.

10. The client device of claim 9, wherein the authentication information comprises: a key; a unique identifier, and a client identifier.

11. The client device of claim 9, wherein the client device is a DHCP client device and the server is a DHCP server.

12. The client device of claim 9, wherein the link layer message is a Link Layer Discovery Protocol (LLDP) message comprising a plurality of type-length-value (TLV) components.

13. The client device of claim 12, wherein the authentication information is included in at least one or more TLV components.

14. The client device of claim 9, wherein using the authentication information to obtain information from the server comprises:
   transmit a discover message including the client identifier;
   receive an offer message transmitted by the server, wherein the second DHCP message includes the unique identifier and a signature, and wherein the signature is based on a Hash-based Message Authentication Code (HMAC) calculated using at least the key;
   transmit a request message including the unique identifier and the signature; and
   receive an acknowledge message including the unique identifier and the signature.

* * * * *